United States Patent [19]

Tsuchiya

[11] Patent Number: 5,408,955

[45] Date of Patent: Apr. 25, 1995

[54] HINGE DEVICE IN AQUARIUM TANK

[75] Inventor: Toshihiro Tsuchiya, Kashiwa, Japan

[73] Assignee: Nisso Industry Co., Ltd., Tokyo, Japan

[21] Appl. No.: 216,422

[22] Filed: Mar. 23, 1994

[30] Foreign Application Priority Data

Mar. 23, 1993 [JP] Japan .............................. 5-018899 U

[51] Int. Cl.6 .............................................. A01K 63/06
[52] U.S. Cl. ..................................................... 119/266
[58] Field of Search .......................... 119/265, 266, 267

[56] References Cited

U.S. PATENT DOCUMENTS

| 2,776,642 | 1/1957 | Sepersky | 119/266 X |
| 3,066,645 | 12/1962 | Mulder | 119/265 |
| 3,125,065 | 3/1964 | Willinger | 119/266 |
| 3,908,598 | 9/1975 | Jewson | 119/267 |

FOREIGN PATENT DOCUMENTS 2239402  7/1991  United Kingdom .

*Primary Examiner*—Robert P. Swiatek
*Attorney, Agent, or Firm*—Oblon, Spivak, McClelland, Maier & Neustadt

[57] ABSTRACT

A hinge device is used in an aquarium tank including a tank body and a lid member mounted on the tank body and having a front lid pivotably attached thereto. The hinge device includes bottomed holes formed in the opposite side surfaces of the lid member, a pair of pin members each including an abutment portion, a shaft portion and a resilient portion between the abutment portion and the shaft portion, and bearing holes formed on opposite side walls of the front lid. The front lid is pivotably attached to the lid member, with the abutment portion abutted against the bottom of the bottomed hole and the shaft portion thrust into the bearing hole by the resilient force of the resilient portion.

2 Claims, 5 Drawing Sheets

HINGE DEVICE IN AQUARIUM TANK

BACKGROUND OF THE INVENTION

1. Field of the Invention

The present invention relates to a hinge device in an aquarium tank for raising tropical fish etc., particularly an aquarium tank comprising a tank body and a lid member mounted on the tank body and provided with an openable and closable front lid.

2. Description of the Prior Art

An aquarium tank good in appearance and having a filter device, an illuminator, etc. which are easy to mount is disclosed in U. K. Patent No. 2,239,402, for example. The prior art aquarium tank comprises a tank body and a lid member mounted on the tank body. The tank body comprises a main frame made of synthetic resin or the like and open on the front, portions of the opposite sides and top, and a transparent frame made of glass, synthetic resin or the like, having a U-shaped sectional profile and mounted in the main frame so that the open front and side portions of the main frame are closed watertightly. The lid member is made of synthetic resin in the form of a shallow dish, has an openable and closable front lid for use in feeding tropical fish etc. and a rear casing in which an illuminator etc. are stored, and is provided on the back surface thereof with a receptacle for a heater etc. The front lid has a pair of bosses projecting toward each other and inserted into shaft holes formed in the framework of the lid member and is thus pivotally attached to the framework of the lid member. In this simply constructed hinge device, where the bosses have a short length, they are liable to disengage from the shaft holes, allowing the front lid to detach from the framework of the lid member. Where the bosses have a large length, it is necessary to widen the distance between the bosses by deforming the front lid when the bosses are inserted into the shaft holes. Such large length of the bosses does not pose a serious problem if the aquarium tank is of a small size. In the case of a large-sized aquarium tank, however, the front lid is difficult to deform and, if the front lid should be made of a deformable material, a strength problem arises.

The front lid and the framework of the lid member can be pivotally attached by screwing from the outside. However, this method poses a problem of workability and detracts from the appearance of the aquarium tank.

The front lid can also be pivotally attached to the framework of the lid member by inserting a coil spring and a pin shaft into a bearing hole and fitting the pin shaft loosely in a shaft hole utilizing the biasing force of the coil spring. In this case, since the coil spring and pin shaft are separate parts, handling and assembly of these parts is troublesome. For example, there is a possibility of coil springs getting entangled with each other during storage and, in such a case, they must be detached before the assembling process. Since the coil springs are used in a highly moist environment and are liable to be wetted with water, they are required to be made of stainless steel or to be plated. This increases the cost of the parts.

The present invention has been proposed to solve the problems mentioned above and has as its main object to provide an inexpensive hinge device in an aquarium tank enabling a front lid to be easily attached to the framework of a lid member and efficiently operated, without detracting from the appearance of the aquarium tank.

SUMMARY OF THE INVENTION

To attain the above object, according to the present invention there is provided a hinge device in an aquarium tank comprising a tank body and a lid member mounted on the tank body and having a front lid pivotably attached thereto, the hinge device comprising bottomed hole means formed in opposite side surfaces of the lid member, a pair of pin members each including an abutment portion, a shaft portion and a resilient portion between said abutment portion and said shaft portion, and bearing hole means formed on opposite side walls of the front lid, the front lid being pivotably attached to the lid member with said abutment portion abutted against the bottom of said bottomed hole means and said shaft portion thrust into said bearing hole means by the resilient force of said resilient portion.

The above and other objects, features and advantages of the present invention will become more apparent to those skilled in the art from the description given hereinbelow with reference to the accompanying drawings.

DESCRIPTION OF THE PREFERRED EMBODIMENT

The present invention will now be described with reference to the illustrated embodiment.

Figure 1:
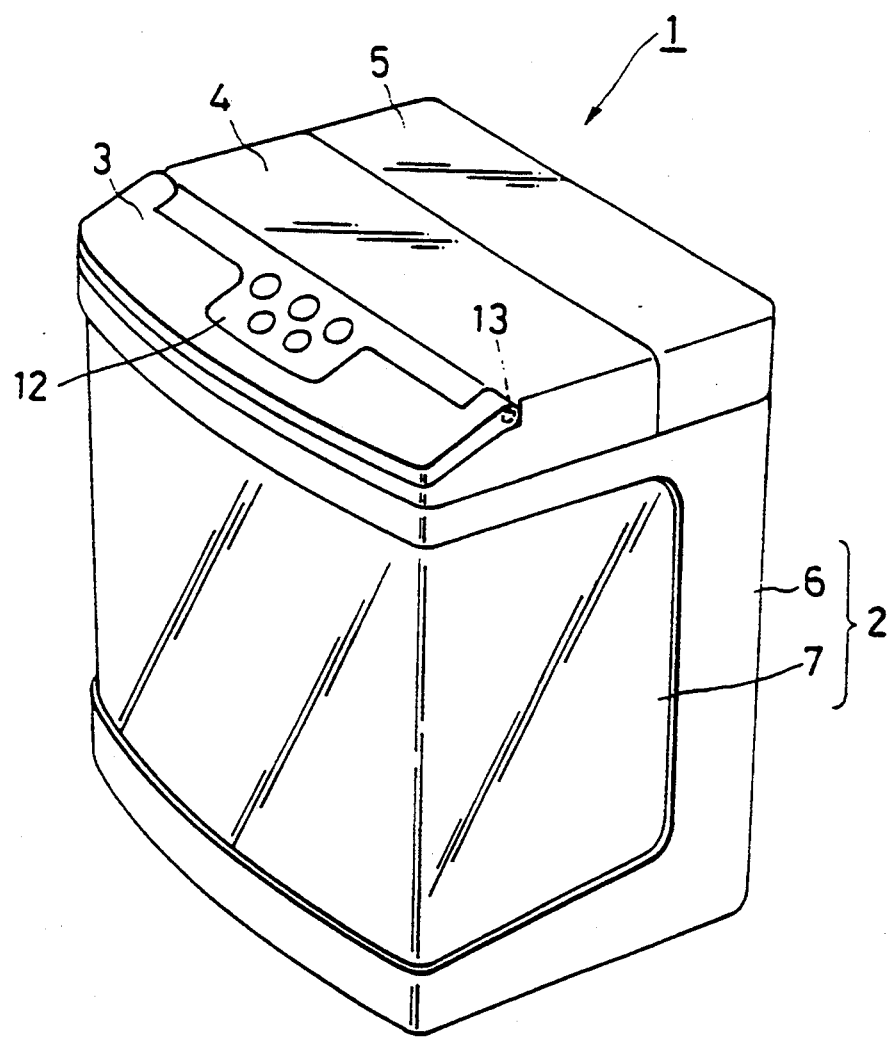
FIG. 1 is a perspective view of an aquarium tank for raising tropical fish etc. and provided with one embodiment of a hinge device according to the present invention.

As shown in FIG. 1, an aquarium tank 1 comprises a tank body 2 and a lid comprising a lid member 4 which has an openable and closable front lid 3 and contains an illuminator etc. (not shown) therein, and a cover member 5 in which a filter member, a pump, etc. (not shown) are accommodated. The lid member 4 and the cover member 5 may be made integral.

Figure 2:
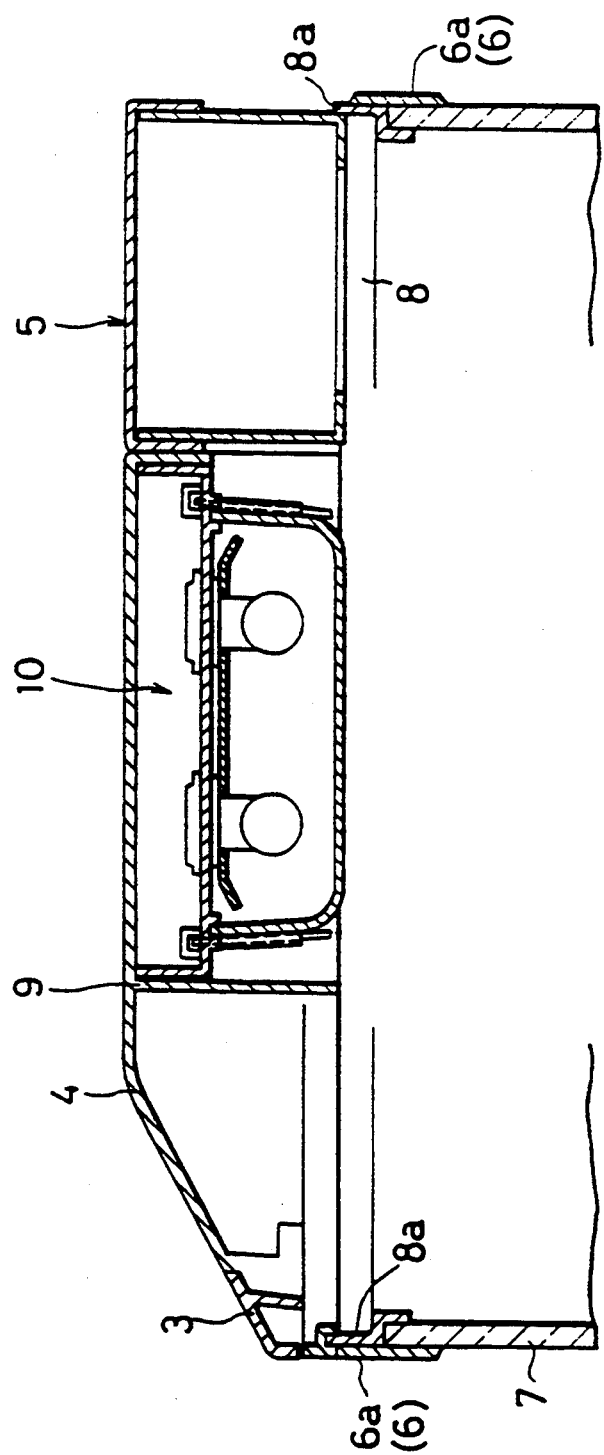
FIG. 2 is a sectioned side view showing the upper portion of the aquarium tank.

The tank body 2 comprises a main frame 6 made of synthetic resin or the like and open on the front, portions of the opposite sides and top, and a transparent frame 7 made of glass, synthetic resin or the like, having a U-shaped sectional profile and mounted in the main frame 6 using adhesive so that the open front and side portions of the main frame 6 are closed watertightly. As shown in FIG. 2, the upper edge of the transparent frame 7 is clamped between the upper end 6a of the main frame 6 and an abutment 8 fitted on the upper end 6a, with engaging pieces 8a provided on the abutment 8 engaging with the lower edges of the lid member 4 and cover member 5. The lid member 4 is formed of a framework 9 of synthetic resin in the form of a shallow dish. The front portion of the framework 9 has the front lid 3 pivotably attached thereto to allow feeding of tropical fish and the remaining interior portion thereof is utilized as an accommodation portion which is in proximity with an illuminator 10 etc. The accommodation portion has an extension which extends forward from the center thereof and at which an operation section 12 including a switch, a timer, etc. (not shown) is formed as shown in FIG. 1. The front lid 3 has a substantially U-shaped notch complementary to the extension part of the lid member 4.

Figure 3:
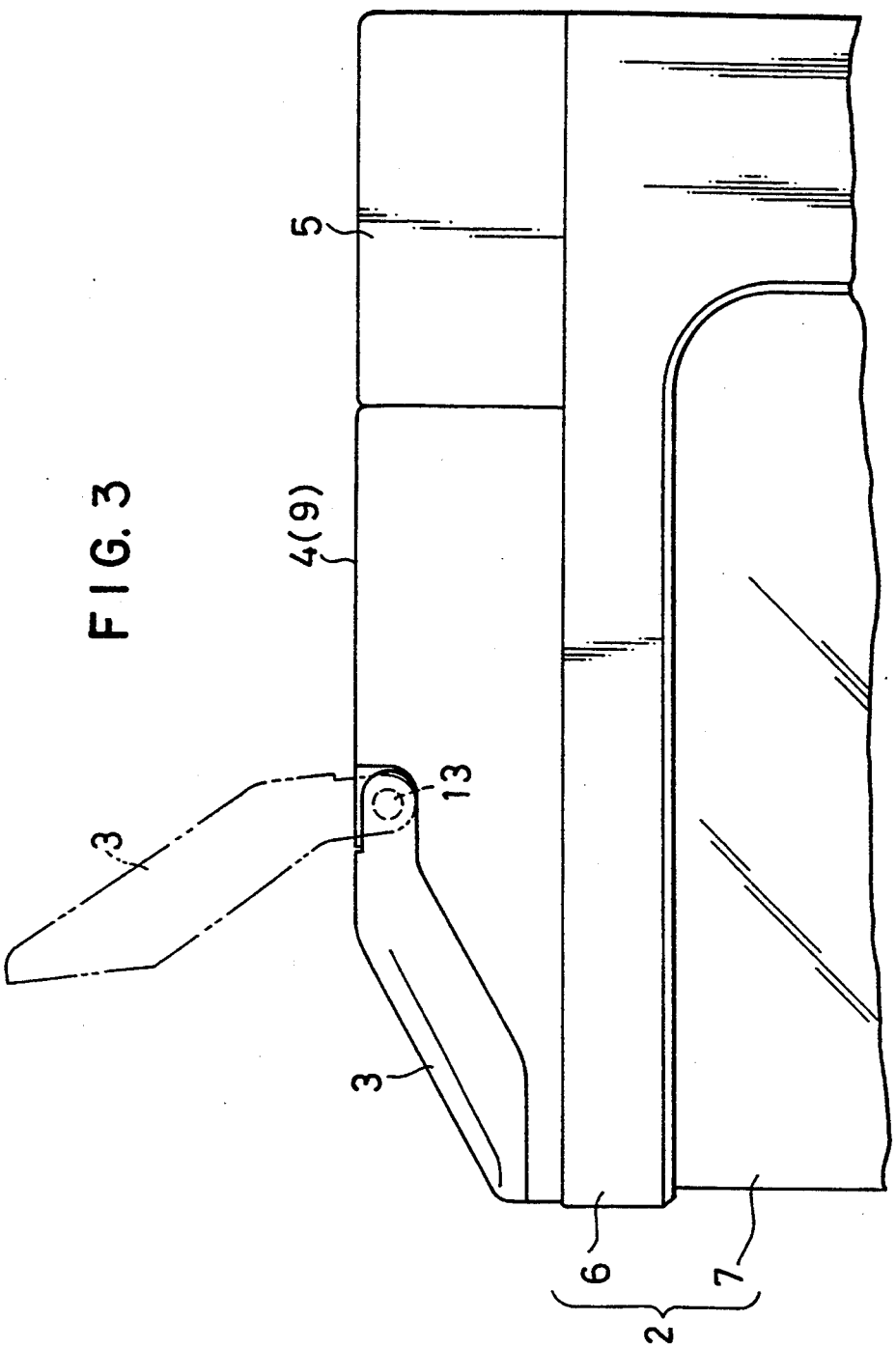
FIG. 3 is a side view showing the upper portion of the aquarium tank.
Figure 4:
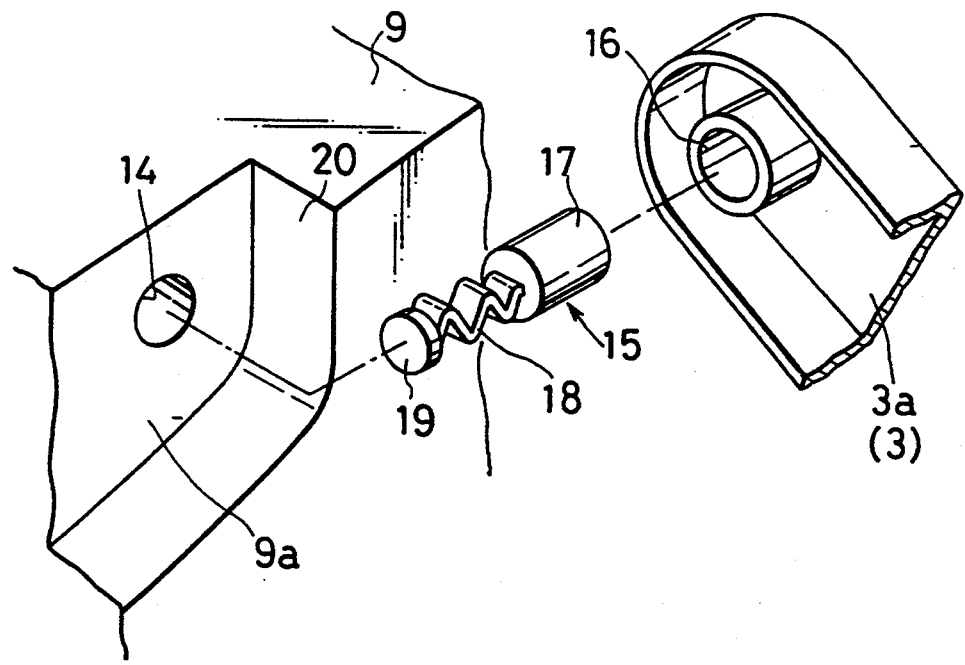
FIG. 4 is an exploded perspective view of the hinge device.

As shown in FIG. 3, the front lid 3 is pivotably attached to the lid member 4 (framework 9) on the opposite sides by means of a hinge device 13. The hinge device 13 will be described in detail with reference to FIG. 4 to FIG. 6.

The hinge device 13 comprises bottomed hole means 14 formed in the opposite side surfaces 9a of the framework 9, bearing hole means 16 formed on the opposite side walls 3a of the front lid 3 and a pair of pin members 15 each inserted into both the bottomed hole means 14 and the bearing hole means 16. Each of the pin members 15 is made from synthetic resin and comprises a solid or hollow cylindrical shaft portion 17, a disk-like abutment portion 19 and a corrugated resilient portion 18 manifesting resiliency against compression force in the axial direction.

Figure 5:
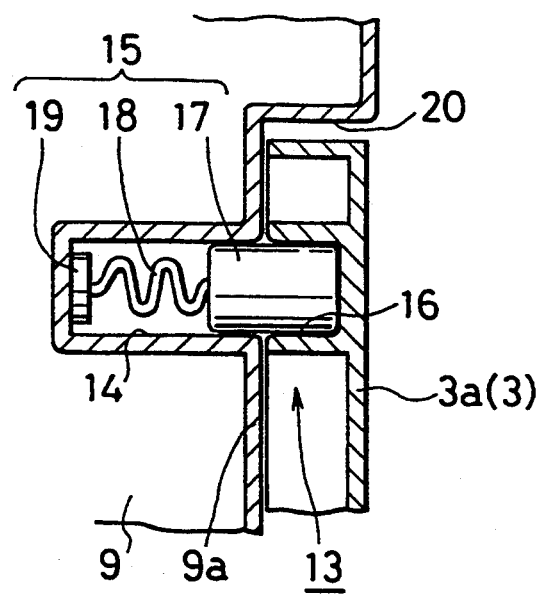
FIG. 5 is a cross section of the hinge device.
Figure 6:
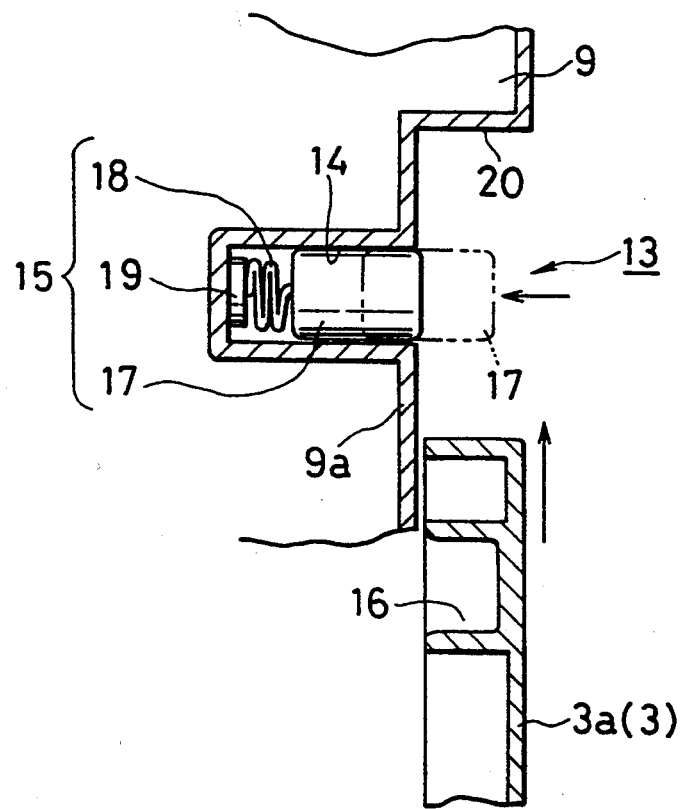
FIG. 6 is an explanatory cross section showing how the hinge device is assembled.

The abutment portion 19 of the pin member 15 is inserted into the bottomed hole means 14 to abut the abutment portion 19 against the bottom of the bottomed hole means 14. In this state, the shaft portion 17 projects from the side surface 9a of the framework 9 as shown by the phantom line in FIG. 6. The shaft portion 17 is thrust into the bottomed hole means 14 against the biasing force of the resilient portion 18 and, at the same time, the side wall of the front lid 3 is slid on and along the side surface 9a of the framework 9 as indicated by the arrow in FIG. 6. As soon as the shaft portion 17 of the pin member 15 confronts the bearing hole means 16 of the front lid 3, it is thrust into the bearing hole means 16 owing to the resiliency of the resilient portion 18 as shown in FIG. 5. Therefore, in this state the front lid 3 is pivotally attached to the framework 9 and cannot easily detach from the framework 9. The framework 9 has a recessed portion 20 complementary in shape to the side wall 3a of the front lid 3, whereby the outer peripheral surface of the lid member 3 is flush with the outer peripheral surface of the framework 9 when the front lid 3 has been pivotally attached to the lid member 4.

As has been described in the foregoing, with the hinge device according to the present invention a front lid can be reliably attached to a lid member with ease to enhance the assembling workability. Since the front lid need not be deformed in attaching it to the lid member, no problem arises rearding its strength, making the hinge device applicable to a large-sized aquarium tank. Furthermore, since the hinge device is invisible from the outside, it is possible to provide an aquarium tank with good aesthetic effect. Moreover, since the shaft portion, resilient portion and abutment portion of the pin members are integrally molded from synthetic resin, the present invention can reduce the number of component parts, facilitate handling of the component parts, enhance the assembling operation in view of the corrugated shape of the the resilient portions which can avoid entanglement with each other, eliminate the possibility of rusting, reduce the manufacturing cost and improve durability.

The present invention has been described with reference to one illustrated embodiment. However, this invention is not limited to this embodiment and may be freely modified within the scope of the appended claims.

Japanese Utility Model Application No. 5-18899 filed Mar. 23, 1993 is hereby incorporated by reference.

What is claimed is:

1. A hinge device in an aquarium tank comprising a tank body and a lid member mounted on the tank body and having a front lid pivotably attached thereto, said hinge device comprising:

bottomed hole means formed in opposite side surfaces of the lid member;

a pair of pin members each including an abutment portion, a shaft portion and a resilient portion between said abutment portion and said shaft portion; and bearing hole means formed on opposite side walls of the front lid;

the front lid being pivotably attached to the lid member with said abutment portion abutted against the bottom of said bottomed hole means and said shaft portion thrust into said bearing hole means by a resilient force of said resilient portion.

2. A hinge device according to claim 1, wherein said pin member is molded from synthetic resin.

* * * * *